(12) United States Patent
Bartlett

(10) Patent No.: US 7,764,965 B2
(45) Date of Patent: Jul. 27, 2010

(54) DYNAMICALLY CHANGING SERVICE CHARACTERISTICS BASED ON DEVICE AND NETWORK CONNECTIVITY ATTRIBUTES

(75) Inventor: R. Scott Bartlett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 11/786,116

(22) Filed: Apr. 10, 2007

(65) Prior Publication Data

US 2008/0253330 A1 Oct. 16, 2008

(51) Int. Cl.
*H04W 36/00* (2009.01)
*G06K 9/36* (2006.01)

(52) U.S. Cl. ...................................... 455/436; 382/232
(58) Field of Classification Search ................. 455/436; 382/232

See application file for complete search history.

(56) References Cited

U.S. PATENT DOCUMENTS

| | | | |
|---|---|---|---|
| 5,987,062 A | | 11/1999 | Engwer et al. |
| 6,832,259 B2 * | | 12/2004 | Hymel et al. ............... 709/229 |
| 2002/0085631 A1 | | 7/2002 | Engwer |
| 2003/0212764 A1 * | | 11/2003 | Trossen et al. .............. 709/219 |
| 2007/0143775 A1 * | | 6/2007 | Savoor et al. .................. 725/1 |

FOREIGN PATENT DOCUMENTS

JP 11275171 A * 10/1999

OTHER PUBLICATIONS

Patent Abstracts of Japan (English Translation) JP 11-275171 (Aug. 10,1999) Otaka, Shoji.*
"PCT Search Report", *Application Serial No. PCT/US2008/004562*, (Jun. 20, 2008),1 pages.
"PCT Written Opinion", *Application Serial No. PCT/US2008/004562*, (Jun. 20, 2008),1 pages.

* cited by examiner

*Primary Examiner*—Marivelisse Santiago-Cordero

(57) ABSTRACT

A system and method for dynamically changing service characteristics based on device and network connectivity attributes. For example, one embodiment of a method comprises: establishing a wireless communication channel with a wireless data processing device over a first type of wireless network; determining a first compression ratio associated with the first type of wireless network; compressing a first portion of content at the first compression ratio; transmitting the first portion of content at the first compression ratio to the data processing device; detecting that the data processing device switches from the first type of wireless network to a second type of wireless network; maintaining the wireless data processing device's online status as the wireless data processing device switches from the first type of wireless network to a second type of wireless network; determining a second compression ratio associated with the second type of wireless network; compressing a second portion of the content at the second compression ratio; and transmitting the second portion of content at the second compression ratio to the user device.

14 Claims, 6 Drawing Sheets

| User ID Code | Device ID Code | User Name | Online Status | SIM IDs | Current Type of Network | Rate of Service |
|---|---|---|---|---|---|---|
| 660098353 | 8859852283 | Scott Doe | Online Dispatcher 605 | 1231234 1232389 | GPRS | Per Data Plan; Roaming Charges Apply; Peak Time Charges Apply |
| 609382528 | 889528536 | Christopher Smith | Online Dispatcher 612 | 3359815 | Wi-Fi | Standard Plan; Roaming Free Peak Time Free |
| 682529853 | 889253825 | Pablo Thomas | Offline | 2231212 | --- | Standard Plan Roaming Free; Peak Time Free |
| ---------- | ---------- | ---------- | ---------- | ---------- | ---------- | ---------- |

*Fig. 5a*

| Unique Network ID | Service Provider | Wireless Network Type | Bandwidth Capability | Associated Rate of Service |
|---|---|---|---|---|
| ABC123456 | Cingular | GPRS | ~20kB | Per Amount of Data Tranmitted |
| XYZ987654 | Verizon | CSD | ~6kB | Per Connection Time |

DYNAMICALLY CHANGING SERVICE CHARACTERISTICS BASED ON DEVICE AND NETWORK CONNECTIVITY ATTRIBUTES

TECHNICAL FIELD

This application relates generally to the field of data processing systems, and more particularly, to dynamically changing service characteristics based on device and network connectivity attributes.

BACKGROUND

Wireless networks are becoming increasingly more prevalent. For example, individuals and businesses today use wireless devices to communicate with one another, access the internet, and to send and receive data. A wide variety of content is available to user devices over wireless networks including Web pages and rich streaming multimedia content.

Virtually all wireless service providers today support both voice and data communication. Exemplary service providers include Verizon Wireless, Cingular Wireless, T-Mobile, and Sprint Nextel. There are various types of wireless networks that currently exist and future network technologies are continually emerging (e.g., CDMA2000, GSM/GPRS, GPRS/CSD, UMTS, HSDPA, and Wi-Fi). Some wireless devices are able to switch between different types of wireless networks having different network connectivity attributes (bandwidth, protocols, etc). For instance, certain wireless devices are capable of switching between GSM EDGE networks, 3G networks and Wi-Fi networks.

Along with the growing use of wireless networks to transfer data to user devices, richer content is being made available such as video and various types of streaming multimedia content. Content today may not only consist of a large amount of data, thus requiring a significant bandwidth for satisfactory transmission, but may also be time-sensitive. If inadequate bandwidth is available for certain types of content such as streaming video, the user experience may be unsatisfactory because of delays or choppiness of the video stream. This problem is compounded as devices switch between networks of different types having different bandwidth capabilities. As a result, network characteristics during a network switch may negatively affect the satisfactory transmission of such content.

Additionally, data-rich content may introduce problems relating to user device attributes. For example, streaming content consumes device storage space and battery life at a faster rate than other types of content. Moreover, data rich content can also have an impact on the cost associated with operating wireless devices. For example, the rate of service for some devices may be dependent upon the amount of data transferred, as is often the case with GPRS devices. The rate of service may also be dependent upon connection time, as in Circuit Switched Data (CSD) connections.

While it is known in the art to compress content based on available bandwidth, services are not currently compressing content dynamically on a per device basis based on detected device and network connectivity attributes.

SUMMARY

A system and method are described for dynamically changing service characteristics based on device and network connectivity attributes. For example, one embodiment of a method comprises: establishing a wireless communication channel with a wireless data processing device over a first type of wireless network; determining a first compression ratio associated with the first type of wireless network; compressing a first portion of content at the first compression ratio; transmitting the first portion of content at the first compression ratio to the data processing device; detecting that the data processing device switches from the first type of wireless network to a second type of wireless network; maintaining the wireless data processing device's online status as the wireless data processing device switches from the first type of wireless network to a second type of wireless network; determining a second compression ratio associated with the second type of wireless network; compressing a second portion of the content at the second compression ratio; and transmitting the second portion of content at the second compression ratio to the user device.

A method according to another embodiment of dynamically changing service characteristics based on device and network connectivity attributes comprises: establishing a wireless communication channel with a user device over a wireless network; detecting device specific information for the user device, the device specific information including at least one selected from the group consisting of information associated with current battery life of the user device, information associated with available storage space on the user device, and information associated with current network cost associated with the user device; determining a compression ratio based on the device specific information; compressing content at the compression ratio; and transmitting the content at the compression ratio to the user device.

BRIEF DESCRIPTION OF THE DRAWINGS

A better understanding of dynamically changing service characteristics based on device and network connectivity attributes can be obtained from the following detailed description in conjunction with the following drawings, in which:

FIG. 5a-b illustrate database tables which may be employed in the embodiments described herein.

DETAILED DESCRIPTION

Throughout the description, for the purposes of explanation, numerous specific details are set forth in order to provide a thorough understanding of dynamically changing service characteristics based on device and network connectivity attributes. It will be apparent, however, to one skilled in the art that the techniques may be practiced without some of these specific details. In other instances, well-known structures and devices are shown in block diagram form to avoid obscuring the underlying principles of dynamically changing service characteristics based on device and network connectivity attributes.

Embodiments of a Data Processing Service

Figure 1:
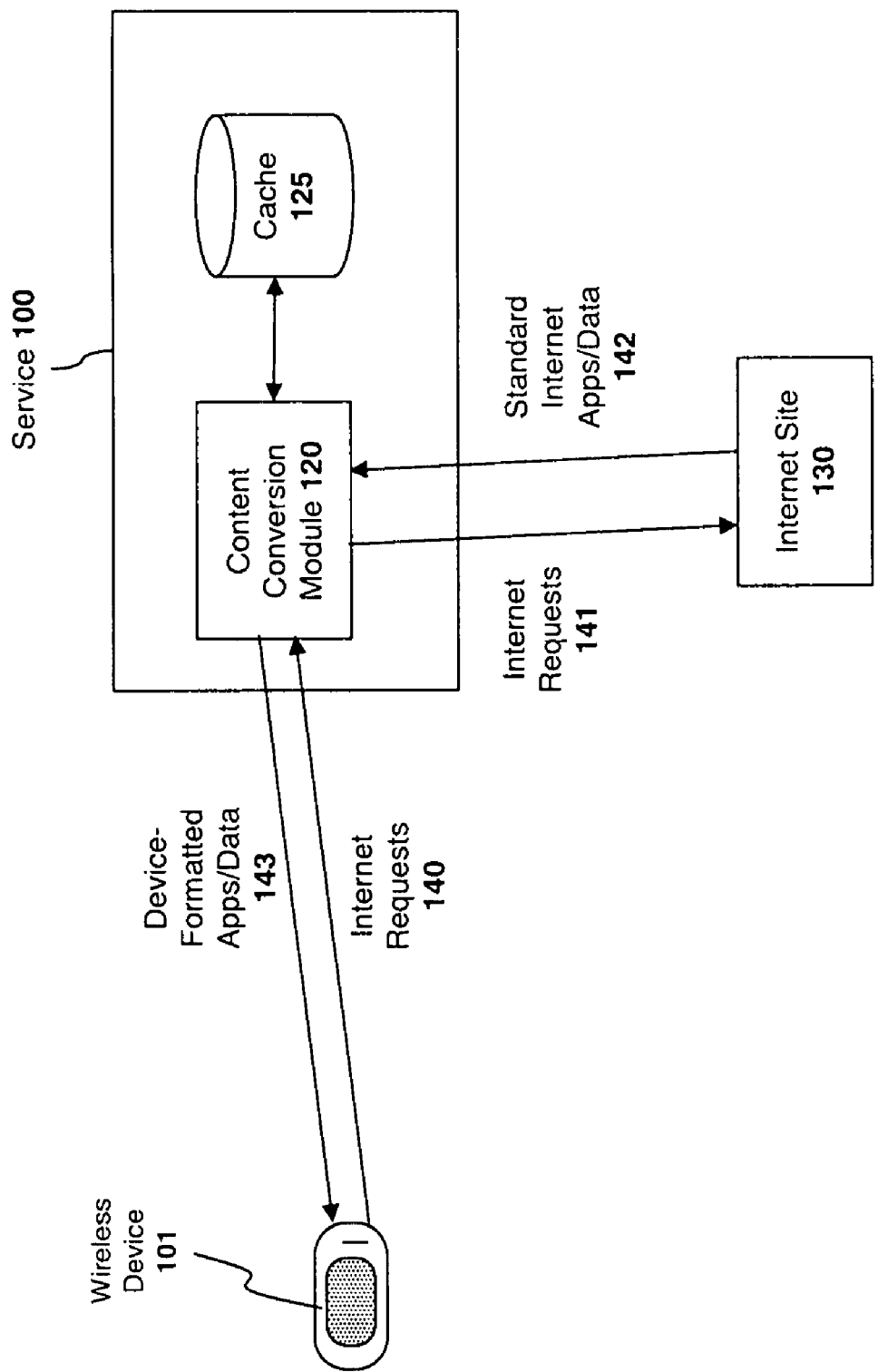
FIG. 1 illustrates a prior art system that includes a service communicating with a data processing device.

Embodiments of dynamically changing service characteristics based on device and network connectivity attributes may be implemented on a wireless device 101 which communicates with a data processing service 100 as illustrated generally in FIG. 1. Embodiments of a service 100 and data processing device 101 are described in U.S. Pat. No. 6,721,804 entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 and an exemplary data processing device 101 will now be described followed by a detailed description of a system and method for dynamically changing service characteristics based on device and network connectivity attributes. As an initial matter, however, it should be noted that the specific data processing device and system architecture described in U.S. Pat. No. 6,721,804 are not required for implementing the underlying principles of dynamically changing service characteristics based on device and network connectivity attributes. Rather, the embodiments described below may be implemented on virtually any type of data processing device including standard personal computers, personal digital assistants and wireless telephones.

In one embodiment, the service 100 converts standard applications and data into a format which each data processing device 101 can properly interpret. Thus, as illustrated in FIG. 1, one embodiment of the service 100 includes content conversion logic 120 for processing requests for Internet content 140. More particularly, the service 100 acts as a proxy for the data processing device 101, forwarding Internet requests 140, 141 to the appropriate Internet site 130 on behalf of the data processing device 101, receiving responses from the Internet site 130 in a standard Internet format (e.g., Web pages with embedded audio/video and graphical content, e-mail messages with attachments, . . . etc), and converting the standard Internet responses 124 into a format which the data processing device 101 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound . . . etc) to the service 100. The conversion logic 120 may then combine the HTML code and embedded content and generate a set of bytecodes for accurately reproducing the requested content on the data processing device 101. As described above, in one embodiment, the bytecodes may be Java bytecodes/applets. However, the conversion logic 120 may generate various other types of interpreted and/or non-interpreted code, depending on the particular type of data processing device 101 being used (e.g., one with an interpreter module or one without).

Because one embodiment of the service 100 maintains an intimate knowledge of the capabilities/configuration of each data processing device 101 (e.g., screen size, graphics/audio capabilities, available memory, processing power, user preferences, . . . etc) it can reconstruct the requested Internet content accurately, while at the same time minimizing the bandwidth required to transmit the content to the device 101. For example, the conversion logic 120 may perform pre-scaling and color depth adjustments to the requested content so that it will be rendered properly within the data processing device's 101's display. In making these calculations, the conversion may factor in the memory and processing power available on the data processing device 101. In addition, the conversion logic 120 may compress the requested content using a variety of compression techniques, and thereby preserve network bandwidth.

Figure 2:
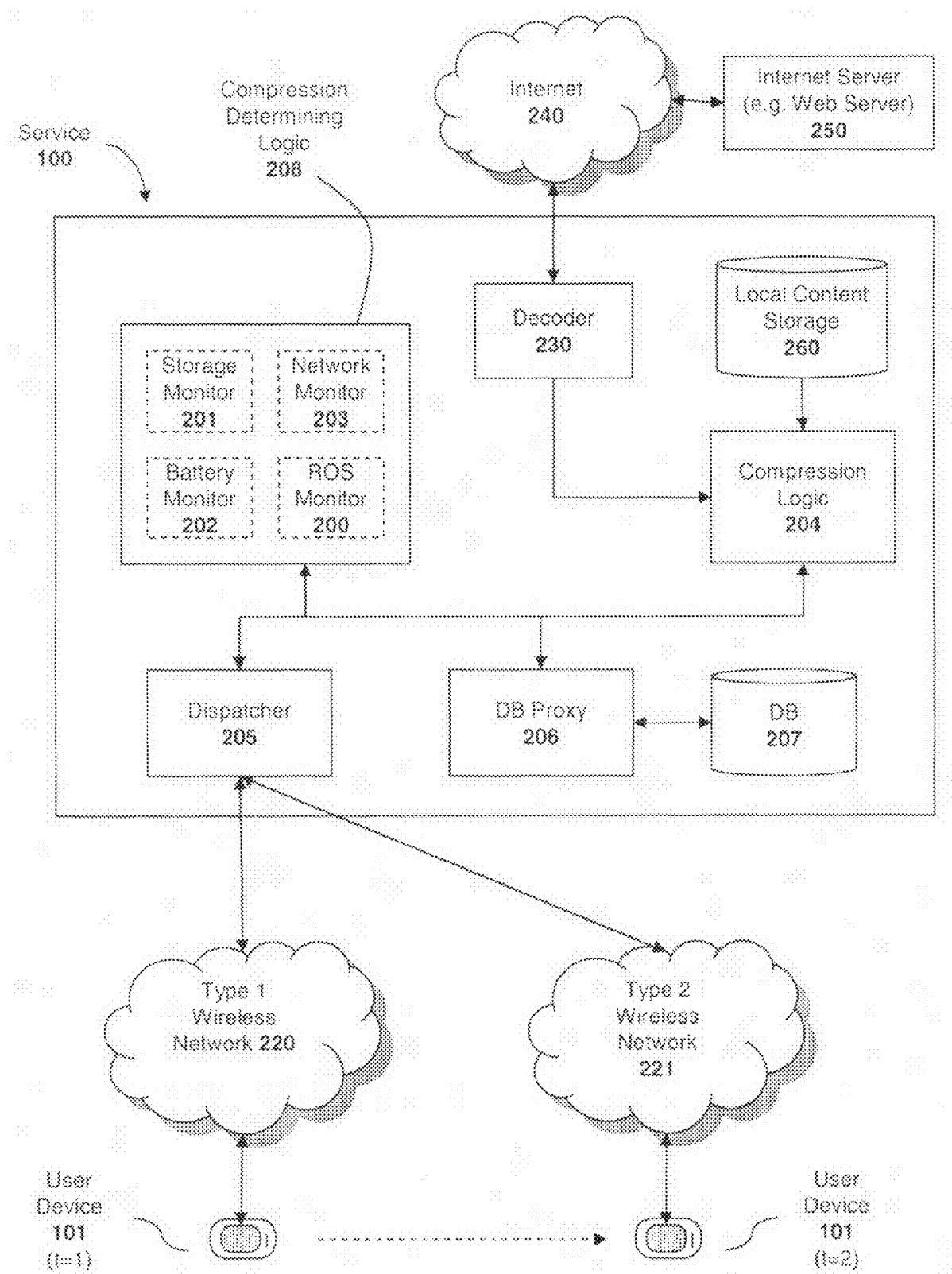
FIG. 2 illustrates a system architecture for changing service characteristics according to one embodiment of dynamically changing service characteristics based on device and network connectivity attributes.

Dynamically Changing Service Characteristics Based on Device and Network Connectivity Attributes FIG. 2 illustrates one embodiment of a system for dynamically changing device and service characteristics basis based on device and network connectivity attributes. The illustrated data processing service 100 includes a dispatcher 205 which is shown communicating with user device 101 over a first type of wireless network 220 at time 1, and over a second type of wireless network 221 at time 2. The dispatcher 205 is communicably coupled to compression determining logic 208, compression logic 204, and a database 207 via a database proxy 206.

As described in detail below, compression determining logic 208 continually monitors device and network connectivity attributes to determine a compression ratio for transmitting content to each user device 101. Compression logic 204 reads content from a content source and compresses it at the determined compression ratio. In this embodiment, compression logic 204 is coupled to local content storage 260 and an Internet server 250 (via decoder 230 and internet 240) and can obtain content from either of the two sources. While both sources of content are included in this exemplary embodiment, the underlying principles of the invention are not limited to a system having these particular sources present. Either source may be used alone and/or any other content source may be used while still complying with the underlying principles of the invention.

The database proxy 206 interfaces other components of the service to the user database 207 including the dispatcher 205 and the compression determining logic 208. The database 207 contains information specific to each user device. For example, the database 207 may include a user's account name, a user's login status, the particular dispatcher that a user device is connected to, a user's rate of service information, subscriber identity module (SIM) information, etc. The database 207 may also include information specific to wireless networks or types of wireless networks as described in greater detail below. For instance, the database 207 may store the known bandwidth capabilities of various types of wireless networks, and rates of service for various wireless networks.

The dispatcher 205 which communicates with a user device 101 over different wireless networks 220 and 221, sometimes referred to herein as "type 1" network and "type 2" network, respectively. Type 1 wireless network 220 and type 2 wireless network 221 may be any type of wireless network including, but not limited to, those mentioned above.

The dispatcher 205 forms the central point of communication between the user device 101 and the service 100, and furthermore, allows the user device 101 to communicate with an Internet server 250, such as a web server, via the Internet 240. In one embodiment, if rich data content is retrieved from an Internet server 250 on behalf of a user, the decoder 230 decodes it before sending to the compression logic 204 for compression. Alternatively, service 100 may obtain the content directly from a local content storage 260. As mentioned above, however, the underlying principles of the invention are not limited to any particular content source.

The service 100 may include a number of dispatchers although only one is shown in the exemplary embodiment of FIG. 2. Additional details associated with the operation of the dispatcher 205 and DB proxy 206 are described in U.S. Pat.

No. 7,162,513, entitled APPARATUS AND METHOD FOR DISTRIBUTING ELECTRONIC MESSAGES TO A WIRELESS DATA PROCESSING DEVICE USING A MULTI-TIERED QUEUING ARCHITECTURE; and the co-pending application entitled SYSTEM AND METHOD FOR PRESERVING SOCKET CONNECTIONS OVER A WIRELESS NETWORK, Ser. No. 11/305,789, Filed Dec. 15, 2005, which are assigned to the assignee of the present application and which are incorporated herein by reference.

In one embodiment, each time a user logs into or out of the service 100, the dispatcher 205 notifies the DB proxy 206 to update the user's online status within the database 207. In addition, given the significant differences in bandwidth between the wireless networks 220, 221 and the local network 209 on which the service 100 operates, the dispatcher 205 may temporarily buffer data transmitted to and from the user device 101 over each individual socket connection.

If the physical/data link connection between the user device 101 and service provider 100 is temporarily lost (e.g., because the user passes through a tunnel), the user will not immediately be disconnected from the dispatcher. Rather, the user's "online" status will be maintained within the database 207 for a specified period of time (e.g., 10 minutes), along with an indication of the dispatcher 205 through which the wireless device is connected.

An exemplary portion of the database 207 is illustrated in FIG. 5a, which contains a mapping of user identification codes 501 to data processing device identification codes 502. The user ID/device ID mapping is used by the service 100 to identify specific information relating to the particular user device 101. In addition, the database 207 contains information such as the user's account name 503, the user's online status 504, including the particular dispatcher through which the user device 101 is communicating, Subscriber Identity Module ("SIM") information 505, the type of wireless network the user is currently communicating over 506, the user's rate of service information 507, bandwidth capabilities of various types of wireless networks 507, and rates of service for various wireless networks 508.

FIG. 5b illustrates another exemplary portion of database 207 which contains information specific to various wireless networks. The unique network ID mapping is used by the service 100 to identify information relating to specific wireless networks. For example, the database 207 contains information such as a unique network ID 508, associated service provider 509, type of wireless network 510, bandwidth capability 511, and associated rate of service 512.

It should be noted that a single table is illustrated in FIGS. 5a and 5b merely for the purpose of explanation. In one embodiment, the database may be a relational database comprised of a plurality of interrelated tables containing the information shown in FIGS. 5a and 5b. The implementation of a relational database is well understood by those of skill in the art.

In one embodiment of the invention, the compression determining logic 208 detects device-specific attributes associated with each wireless device, determines a compression ratio associated with each device, and controls the compression logic 204 accordingly. Alternatively, or in addition, the determined compression ratio can be used to obtain the corresponding pre-compressed content stored in the local content storage 260.

In one embodiment, the device-specific information used by the compression determining logic 208 to determine an appropriate compression ratio includes the available storage capacity on each device, the current battery life of each device, the cost of service for utilizing each wireless network, the type of network being used, and changes in bandwidth and/or signal strength due to network congestion or network switching. As illustrated in FIG. 2, the compression determining logic 204 includes a storage monitor 201, battery monitor 202, rate of service (ROS) monitor 200, and network monitor 203.

The storage monitor 201 detects device-specific information related to the current available storage capacity on the data processing device 101 and/or the "newness" of content relative to content stored in memory.

The battery monitor 202 detects device-specific information related to the battery life of the user device 101. Battery life information may include battery life remaining, and/or time until a routine charging time.

The network monitor 203 detects device-specific information related to network connectivity of the wireless network to which the user device 101 is connected. Examples of network connectivity attributes include: the bandwidth capability of wireless networks and/or wireless network types; deviations in network bandwidth; switches between networks of different types; and signal strength.

The Rate of Service (ROS) monitor 203 detects the cost of service associated with user device 101 and determines a compression ratio accordingly. In one embodiment, at more expensive rates, a higher compression ratio is used to decrease costs by shortening download time and reducing total data downloaded. Various factors may affect the ROS for a user device including the wireless network and/or wireless network type, the "time of day" of usage, and the location of the user device during usage.

In one embodiment, the compression determining logic 208 detects device-specific information from each of the monitors to determine a resultant compression ratio. In another embodiment, the highest compression ratio determined by a single monitor overrides any of the other compression ratios determined for the other monitors, thus ensuring a conservative compression ratio.

Figure 3:
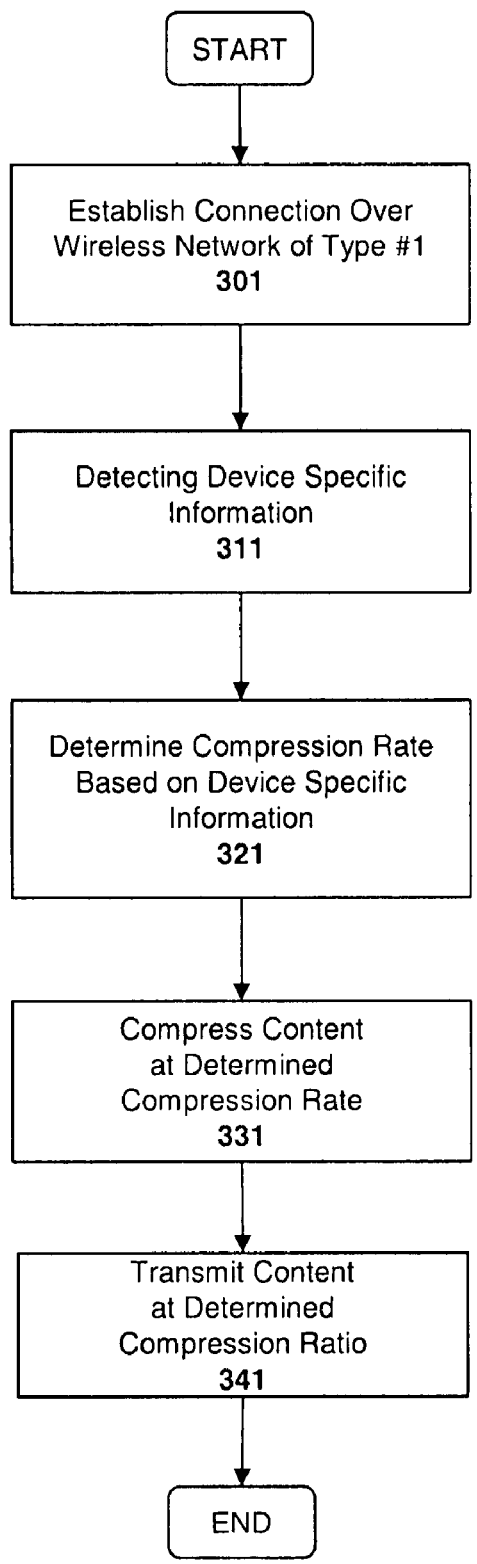
FIG. 3 illustrates a process for changing service characteristics according to one embodiment of dynamically changing service characteristics based on device and network connectivity attributes.

FIG. 3 illustrates one embodiment of a process implemented by the compression determining logic 208 to dynamically adjust the compression ratio for each wireless device. At 301, service 100 establishes a wireless communication channel with a user device 101 over a first type of wireless network 220 and dispatcher 205. The dispatcher 205 notifies the DB proxy 206 to update the user's online status within the database 207. At 311, the compression determining logic 208 detects device-specific attributes such as available storage capacity, existing battery life, cost of service, and network connectivity (e.g., type of network being used, signal strength, available bandwidth). At 321, the compression determining logic 208 determines a compression ratio based on the device specific-information.

At 331, content to be transmitted over the first type of wireless network 220 to the user device 101, is compressed by the compression logic 204 at the compression ratio determined at 321. Content may be obtained from a local content storage 260, or alternatively from an Internet server 250 (e.g., a Web server) via a connection maintained by the service 100 on behalf of the user. At 341, the content that is compressed at the compression ratio determined at 321 is transmitted to the user device 101 over wireless network 220 of type 1.

As mentioned above, the storage monitor 201 detects device specific information related to storage on the user device 101 and determines a corresponding compression ratio based on the storage information. For example, if the storage monitor 201 detects that the amount of available storage space remaining on the user device 101 is below a specified threshold value, then the compression determining logic 208 may select a relatively higher compression ratio to conserve storage space on the data processing device. In one embodiment, data processing device 101 reports its available data storage to the service 100 periodically. In this way, any content to be transmitted to user device 101 can be compressed to ensure that it will fit in the available storage space. In another embodiment, user device 101 reports its available data storage to service 100 only when storage space is below a specified value. In yet another embodiment, the compression determining logic 208 polls each data processing device to determine available storage capacity prior to transmitting content to the device.

In another instance, older content stored on the user device may be deleted but retransmitted to the user device 101 by service 100 using a relatively high compression ratio (i.e., removing old content and replacing it with a more compressed version of the same content in order to save storage space). In one embodiment, the user device 101 periodically provides service 100 with a list of its stored content and the corresponding download date. The compression determining logic 208 then deletes and retransmits the oldest content whenever additional space is needed. Additionally, storage monitor 201 may detect preferred settings for specific compression ratios set by the user of the data processing device 101 in order to conserve space. In another embodiment, the device 101, at the behest of the service 100, may recompress the content itself at a different compression ratio.

In one embodiment, the battery monitor 202 detects device-specific information related to battery life and determines a corresponding compression ratio based on the battery life information. For example, if the battery monitor 202 detects that the existing battery life of a particular wireless device is below a specified threshold value, then it may increase the compression ratio in an effort to conserve battery life. In one embodiment, user device 101 reports its battery life level to service 100 periodically. In this way, any content to be transmitted to user device 101 such as a scheduled download or streaming media can be compressed accordingly. In another embodiment, a data processing device 101 reports its battery life level to service 100 only when battery life dips below a specified threshold value. It should be appreciated that various other ways of transmitting battery information from the user device 101 to service 100 may be implemented while still complying with the underlying principles of the invention.

The battery monitor 202 may also detect when the user device 101 is routinely charged and adjust the compression ratio accordingly, thus coordinating the compression ratio with the time remaining until the next anticipated time of charging. In one embodiment, user device 101 periodically reports times when it is recharged to service 100. The service 100 uses this information to adjust the compression ratio according to an estimated time until the next recharging. For example, if the device is scheduled to be recharged soon, a relatively lower compression ratio may be used notwithstanding the current battery life of the device. In another embodiment, the user of user device 101 may estimate the time until the next recharge, and report this information to the service. It should be appreciated that various other ways of transmitting battery information from the user device 101 to service 100 may be implemented while still complying with the underlying principles of the invention In one embodiment, the network monitor 203 detects the network attributes of the wireless network to which the data processing device 101 is connected and determines a compression ratio based on the network attributes. For example, network monitor 203 may detect that user device 101 is connected to a first type of wireless network 220 having a specified bandwidth capability (e.g., GPRS or Wi-Fi) and determine a compression ratio based on the specified bandwidth. In one embodiment, the data processing device 101 queries the wireless network 220 to which it is connected in order to determine the network attributes (e.g., the unique network ID, or the type of network). A query may consist of the data processing device's operating system communicating with the radio microprocessor on the device to determine the cell tower to which it is currently connected. The cell tower returns a unique network ID code mapped to a string which is used to identify the wireless network and the wireless network type. The data processing device 101 then transmits the network information to the network monitor component 203 of the compression determining logic 208 which then accesses the database 207 to obtain the known bandwidth capability 511 associated with that particular unique network ID 508 and/or type of wireless network 510.

In another embodiment, service 100 pings the user device 101 and determines a relative bandwidth based on the time for the ping to travel to the user device and back. The network monitor 203 then determines a compression ratio accordingly. In yet another embodiment, the user device 101 pings the service 100 and determines a relative bandwidth based on the time for the ping to travel to the service 100 and back. Then the user device 101 sends this network information to the service 100 and network monitor 203 determines an appropriate compression ratio. The service 100 may obtain network information in various other ways while still complying with the underlying principles of the invention.

In one embodiment, once an initial bandwidth has been determined, the network monitor 203 continually monitors the network 220 for changes in network conditions (e.g., changes in bandwidth) and adjusts the compression ratio to an appropriate level. In addition, in one embodiment, the network monitor 203 monitors the state of the wireless device to determine a compression ratio. For example, if a FIFO buffer for storing the compressed content within the wireless device (i.e., prior to decompression) reaches a specified threshold value (e.g., 85% full) then a relatively higher compression ratio may be selected. By contrast, if the receive buffer is below a specified threshold (e.g., 20% full), then a relatively lower compression ratio may be selected.

In one embodiment, the device periodically reports signal strength values to the network monitor 203 indicating the strength of the signal to which the device is connected. A relatively lower signal strength will generally indicate that a relatively higher compression ratio should be used and a relatively higher signal strength will generally indicate that a relatively lower compression ratio should be used.

In one embodiment, the network monitor 203 also detects when the user device switches from the first type of wireless network 220 to a second type of wireless network 221, and dynamically adjusts the compression ratio when necessary. For instance, if the first type of wireless network 220 is a GPRS network and the second type of network 221 is a Wi-Fi network (i.e., a network having a relatively greater bandwidth capacity), the network monitor may decrease the compression ratio. Conversely, when the device switches from the Wi-Fi network to the GPRS network, the network monitor 203 detects the switch and increases the compression ratio. The various implementations discussed above related to ping times and user device queries may also be used to determine switches between network types and the corresponding change in bandwidth capabilities.

In one embodiment, the rate of Service (ROS) monitor 200 detects the cost of service associated with the user device to determines an appropriate compression ratio. At more expensive rates (e.g., when the device is roaming), a higher compression ratio is used to decrease costs by shortening download times and reducing the total data downloaded. For example, the user of data processing device 101 may subscribe to a service plan which charges different rates of cost depending on the wireless network to which the data processing device is connected. In this embodiment, the ROS monitor 200 detects when the data processing device switches to a network which is more or less expensive and then selects a relatively higher or lower compression ratio, respectively. In addition, in one embodiment, the ROS monitor 200 detects whether the data processing device is connected to the wireless network at a particular time of day that is a more or less expensive for the user, and then uses this information to determine an appropriate compression ratio. In another embodiment, the ROS monitor adjusts compression ratios based upon the rate plan subscribed to by each user. For example, user devices on "premium" rate plans are provided with relatively higher quality data (i.e., with less compression) than "standard" rate plans. It should be appreciated that service 100 may obtain ROS information in various other ways while still complying with the underlying principles of the invention.

In one embodiment, the user device 101 queries the first and second types of network 320 and 321, respectively, as described above, and uses the network information (e.g., unique network ID, or network type) to retrieve ROS information from the database 207. This retrieved rate of service information is then used by ROS monitor 200 to determine an appropriate compression ratio. In one embodiment, the user device 101 sends the service 100 its user ID code 501 or device ID code 502 which is used to obtain the rate of service information 507 for the ROS monitor 200. It should be appreciated that service 100 may obtain ROS information in various other ways while still complying with the underlying principles of the invention.

While the compression determining logic 208 shown in the embodiment in FIG. 2 includes a ROS monitor 200, a storage monitor 201, a battery monitor 202, and network monitor 203, it should be appreciated that the compression determining logic 208 may include only a single one of the four monitors 200, 201, 202, 203, or may include any combination of monitors 200, 201, 202, 203 while still complying with the underlying principles of the invention.

In one embodiment, the compression determining logic 208 evaluates the device specific information from each of the monitors 200, 201, 202, 203 to determine a single compression ratio based on the device specific information detected by each monitor, thereby providing for a variable compression ratio with fine granularity. In another embodiment, the highest compression ratio determined by a single monitor overrides any of the other compression ratios determined for the other monitors, thus ensuring a conservative compression ratio.

Furthermore, it should be appreciated that the underlying principles of the invention are not limited to the compression determining logic 208 detecting these specific examples of device specific information. The compression determining logic 208 may include monitors that detect any information specific to the attributes of user device 101 or its network connectivity, and thereafter determine a compression ratio.

Additionally, the compression determining logic 208 may set a compression ratio based on user preferences. For example, a user may specify whether the compression radio should be modified based on the variables described above (e.g., battery life, cost of service, etc). The user may also specify a particular compression ratio for each type of application (e.g., lowest practical ratio for video, highest practical ratio for audio, etc). In fact, any of the different embodiments described above may be enabled, disabled, and/or configured based on specified user preferences.

In one embodiment, the compression logic 208 compresses content from different sources at different compression ratios. For example, content purchased from the service 100 or an associated carrier may be compressed at a higher quality (i.e., less compressed) rate whenever possible because the purchaser is already paying for the additional bandwidth costs as part of the purchase.

In one embodiment, both the compression ratio and the rendered size of a video image is changed if the user modifies the viewable size of the video (e.g., while the user performs other operations on the data processing device). By way of example, if the user is on a video conferencing call, but needs to look something up during the call, then the service will scale the video stream down to reduce network traffic while the display window is shrunk down. By way of another example, one embodiment of the device includes a picture-in-picture capability. In this example, if there are two video streams, the user can chose which stream is in the foreground. The background stream is then sent at a much higher compression rate and smaller rendered size, while the foreground stream is sent per the previous scheme. When the user changes which stream is in the foreground, the service changes the compression ratios/rendered sizes to give the newly-picked stream bandwidth priority. In these embodiments, the actual rendered size will depend upon the device attributes (of which the service is aware).

Figure 4:
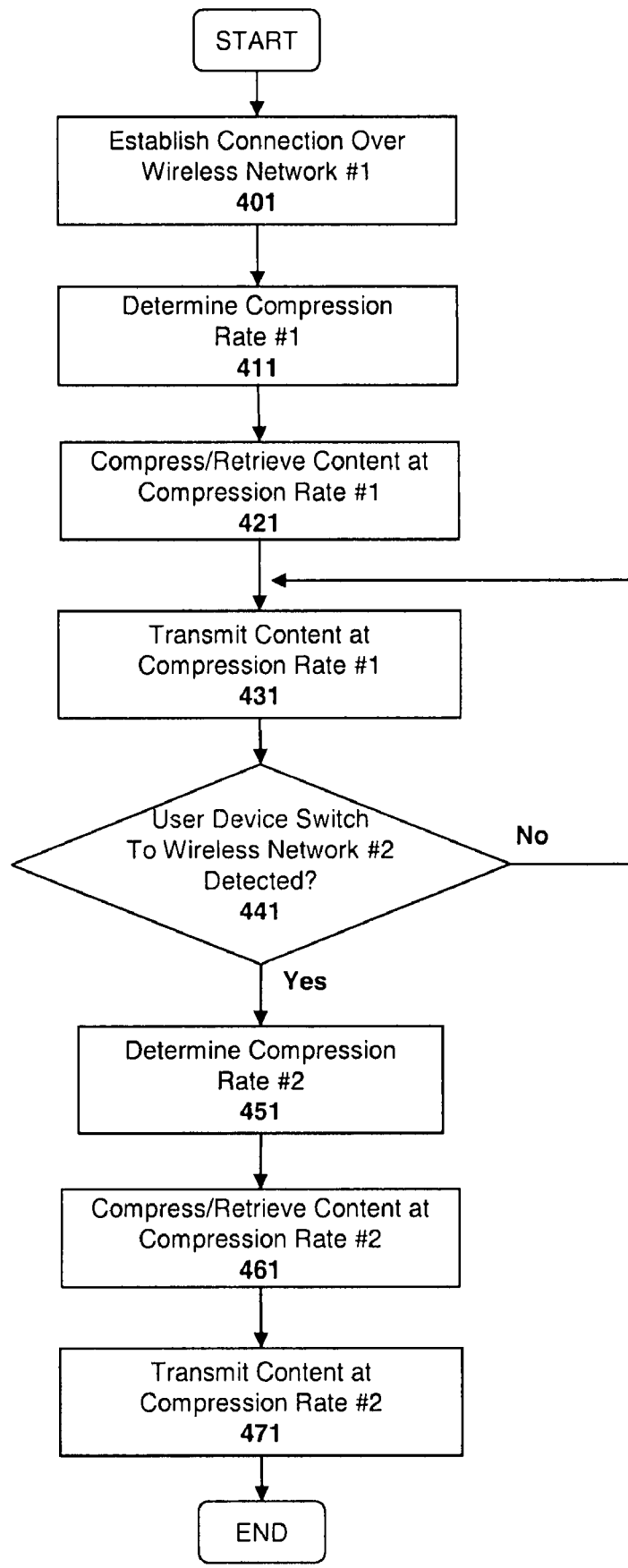
FIG. 4 illustrates a process for changing service characteristics according to one embodiment of dynamically changing service characteristics based on device and network connectivity attributes.

FIG. 4 illustrates one embodiment of a process implemented by service 100 to modify the compression ratio when a wireless device transitions from a first network type to a second network type. At 401, service 100 establishes a wireless communication channel with a user device 101 over the first type of wireless network 220 through a dispatcher 205. The dispatcher 205 notifies the DB proxy 206 to update the user's online status within the database 207.

At 411, a compression ratio associated with the first type of wireless network 220 (compression ratio #1) is determined by the network monitor 203. For example, the network monitor 203 may identify the network 220 and select a compression ratio associated with that network from the database 207.

At 421, content is compressed by the compression logic 204 at compression ratio #1. As mentioned above, the content may be obtained from a local content storage 260 before being compressed, or obtained from an Internet server 250 (e.g., a Web server) via a connection maintained by the service 100 on behalf of the user. In another embodiment, content is pre-compressed at different compression ratios and stored within the local content store 260. Compression logic 204 then retrieves the pre-compressed content compressed at compression ratio #1.

At 431, the content that is compressed at compression ratio #1 is transmitted to the user device 101 over the first type of wireless network 220.

At 441, if the compression determining logic 208 detects that the user device 101 switches from the first type of wireless network 220 to a second type of wireless network 221, then network information for the second type of network is obtained in the same manner as described above. If no switch is detected, then the content continues to be compressed at compression ratio #1 prior to transmission to the data processing device 101. However, if a switch is detected, a second compression ratio associated with second type of wireless network 221 is determined, as shown at 451. In the case of a switch between networks, the dispatcher 205 maintains the user's online status, thus maintaining a continuous virtual connection for the user device as the user device 101 switches to the second type of wireless network 221.

At 451, compression determining logic 208 determines a second compression ratio associated with wireless second type of network 221. For instance, if user device 101 switches from the first type of wireless network 220 to a second type of wireless network 221 having relatively lower or higher bandwidth capability, then network monitor 203 increases or decreases the compression ratio, respectively.

At 461, in one embodiment, content is compressed by the compression logic 204 at compression ratio #2. In an embodiment in which content is pre-compressed at different compression ratios and stored within the local content store 260, the compression logic 204 retrieves the pre-compressed content compressed at compression ratio #2.

At 471, the content that is compressed at compression ratio #2 is transmitted to the user device 101 over the second type of wireless network 221. Despite the switch in the wireless connection between the user device 101 and the service 100 (even if a temporary break in connection with service 100 occurs), the dispatcher 205 maintains the user's online status in the database 207 and continues to transmit the content over second type of wireless network 221 when the user device reconnects to the second wireless network 221 in the allotted period of time. Consequently, content continues to be transmitted to the user device in a almost seamless manner, while at the same time taking into account the attributes of the two wireless networks 220, 221 by compressing the content accordingly.

It should be appreciated that this process may be repeated for any additional switches between different network types. Therefore, any additional switches will result in the compression ratio of the content to be adjusted based on the attributes of each of the networks.

Various different levels of compression may be employed based on the information gathered for each wireless device. For example, many different compression ratios may be selected for various states of battery life, while only a few different compression ratios may be selected for each of the different network types.

The compression logic 204 describe above may employ various types of compression algorithms at different compression ratios for audio and/or video, for example, MP-3, AAC, MPEG-2, MPEG-4 and/or Windows Media formats. The underlying principles of the invention are not limited to any particular set of compression algorithms.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments described above are limited to a wireless implementation, the underlying principles of the invention may be employed in a variety of different types of networks. Similarly, while the protocol stack described above is implemented using Java, the underlying principles of the invention are not limited to any particular programming language.

Accordingly, the scope and spirit of the invention should be judged in terms of the claims which follow.

What is claimed is:

1. A method comprising:
  establishing a wireless communication channel with a wireless data processing device over a first type of wireless network;
  determining a first compression ratio associated with the first type of wireless network;
  compressing a first portion of content at the first compression ratio;
  transmitting the first portion of the content at the first compression ratio to the wireless data processing device over the first type of wireless network;
  detecting that the wireless data processing device switches from the first type of wireless network to a second type of wireless network;
  maintaining an online status of the wireless data processing device as the wireless data processing device switches from the first type of wireless network to the second type of wireless network, the online status of the wireless data processing device being maintained by:
    detecting that the wireless data processing device has disconnected from the first type of wireless network;
    temporarily maintaining the online status of the wireless data processing device while disconnected from the first type of wireless network; and
    detecting that the wireless data processing device connects to the second type of wireless network within a time period less than a specified time threshold value;
  determining a second compression ratio associated with the second type of wireless network;
  compressing a second portion of the content at the second compression ratio; and
  transmitting the second portion of the content at the second compression ratio to the wireless data processing device over the second type of wireless network.

2. The method of claim 1 wherein at least one of the first compression ratio or the second compression ratio corresponds to no compression.

3. The method of claim 1 wherein the second type of wireless network has a smaller bandwidth than the first type of wireless network and wherein the first compression ratio is relatively smaller than the second compression ratio.

4. The method of claim 1 wherein the first portion of the content comprises a first portion of a video stream and the second portion of the content comprises a second portion of the video stream.

5. The method as in claim 1 further comprising:
  detecting that available battery life on the wireless data processing device has fallen below a threshold value; and responsively decreasing at least one of the first compression ratio or the second compression ratio to a third compression ratio that is higher than at least one of the first compression ratio or the second compression ratio.

6. The method as in claim 1 further comprising:

detecting that available storage capacity on the wireless data processing device has fallen below or has gone above a threshold value; and responsively changing at least one of the first compression ratio or the second compression ratio to a third compression ratio that is higher or lower than at least one of the first compression ratio or the second compression ratio.

7. The method as in claim 1 wherein at least one of the first compression ratio or the second compression ratio are determined, at least in part, based on user-specified preferences.

8. A method comprising:

establishing a wireless communication channel with a user device over a wireless network;

detecting device specific information for the user device, the device specific information including at least one of information associated with current battery life of the user device, information associated with available storage space on the user device, or information associated with a current network cost associated with the user device;

determining a compression ratio that minimizes a bandwidth utilized to transmit content to the user device when the device specific information is detected;

compressing the content at the compression ratio;

transmitting the content at the compression ratio to the user device;

maintaining an online status of the user device when the user device switches from the wireless network to a different wireless network, the online status of the user device being maintained by:

detecting that the user device has disconnected from the wireless network;

temporarily maintaining the online status of the user device while disconnected from the wireless network; and detecting that the user device connects to the different wireless network within a time period less than a specified time threshold value.

9. The method of claim 8 wherein the information associated with the current battery life includes at least one of battery life remaining or time remaining until a time of charging.

10. The method of claim 8 wherein the information associated with the available storage space on the user device includes at least one of storage space remaining or when the content was stored on the user device.

11. The method of claim 8 wherein the information associated with the current network cost associated with the user device includes at least one of a rate of cost for a time of day or a rate of cost based on a location of the user device.

12. The method as in claim 8 wherein the compression ratio is determined, at least in part, based on user-specified preferences.

13. A method comprising:

establishing a wireless communication channel with a user device over one or more wireless networks;

detecting information related to a cost of operating the user device over each of the one or more wireless networks for content requested by the user device;

determining a compression ratio that minimizes a bandwidth utilized to transmit content to the user device when the information related to the cost of operating the user device is detected;

compressing the content at the compression ratio;

transmitting the content at the compression ratio to the user device;

maintaining an online status of the user device when the user device switches from a first wireless network to a second wireless network, the online status of the user device being maintained by:

detecting that the user device has disconnected from the first wireless network;

temporarily maintaining the online status of the user device while disconnected from the first wireless network; and detecting that the user device connects to the second wireless network within a time period less than a specified time threshold value.

14. The method as in claim 13 wherein the content requested by the user device includes at least one of a premium rate plan or premium content associated with the user device.

* * * * *